United States Patent [19]

Chazelas

[11] 4,418,240

[45] Nov. 29, 1983

[54] ELECTRICAL STRESS CONTROL ELECTRODE IN COMBINATION WITH A JUNCTION END OF A SHIELDED INSULATED ELECTRICAL CONDUCTOR

[75] Inventor: Elie Chazelas, Montereau, France

[73] Assignee: Societe Industrielle de Liaisons Electriques Silec, Paris, France

[21] Appl. No.: 249,864

[22] Filed: Apr. 1, 1981

[30] Foreign Application Priority Data

Apr. 2, 1980 [FR] France .................. 80 07487

[51] Int. Cl.³ .................. H02G 15/064; H02G 15/184
[52] U.S. Cl. .................................. 174/73 R; 338/217
[58] Field of Search .................. 174/73 R, 73 SC, 80; 338/138, 217

[56] References Cited

U.S. PATENT DOCUMENTS

| | | | |
|---|---|---|---|
| 1,576,621 | 3/1926 | Andersen | 338/217 |
| 1,992,410 | 2/1935 | Benkelman | 338/217 |
| 1,992,529 | 2/1935 | Henry | 338/217 |
| 3,210,460 | 10/1965 | Suelmann | 174/73 R |
| 3,644,662 | 2/1972 | Salahshourian | 174/73 R |

FOREIGN PATENT DOCUMENTS

| | | | |
|---|---|---|---|
| 2053896 | 4/1972 | Fed. Rep. of Germany | 174/73 R |
| 2739600 | 3/1979 | Fed. Rep. of Germany | 174/73 R |
| 2423036 | 11/1979 | France | 174/73 R |
| 1526397 | 9/1978 | United Kingdom | 174/73 R |

*Primary Examiner*—Laramie E. Askin
*Attorney, Agent, or Firm*—Cushman, Darby & Cushman

[57] ABSTRACT

The electrical stress control electrode to be arranged around an unshielded junction end portion of a conductor insulator comprises a sheathing member having several successive adjacent zones each having a non-linear electrical resistance different from the adjacent zones, said resistance typically increasing towards the high voltage parts of the junction. The zones are made of a plastic material support compound or binder including particles of silicon carbide or zinc oxide, the different resistances being obtained by varying the concentration of particles of a same grain size from a zone to another, or by progressively steppingly varying the grain size of the particles for a given concentration from a zone to another.

1 Claim, 13 Drawing Figures

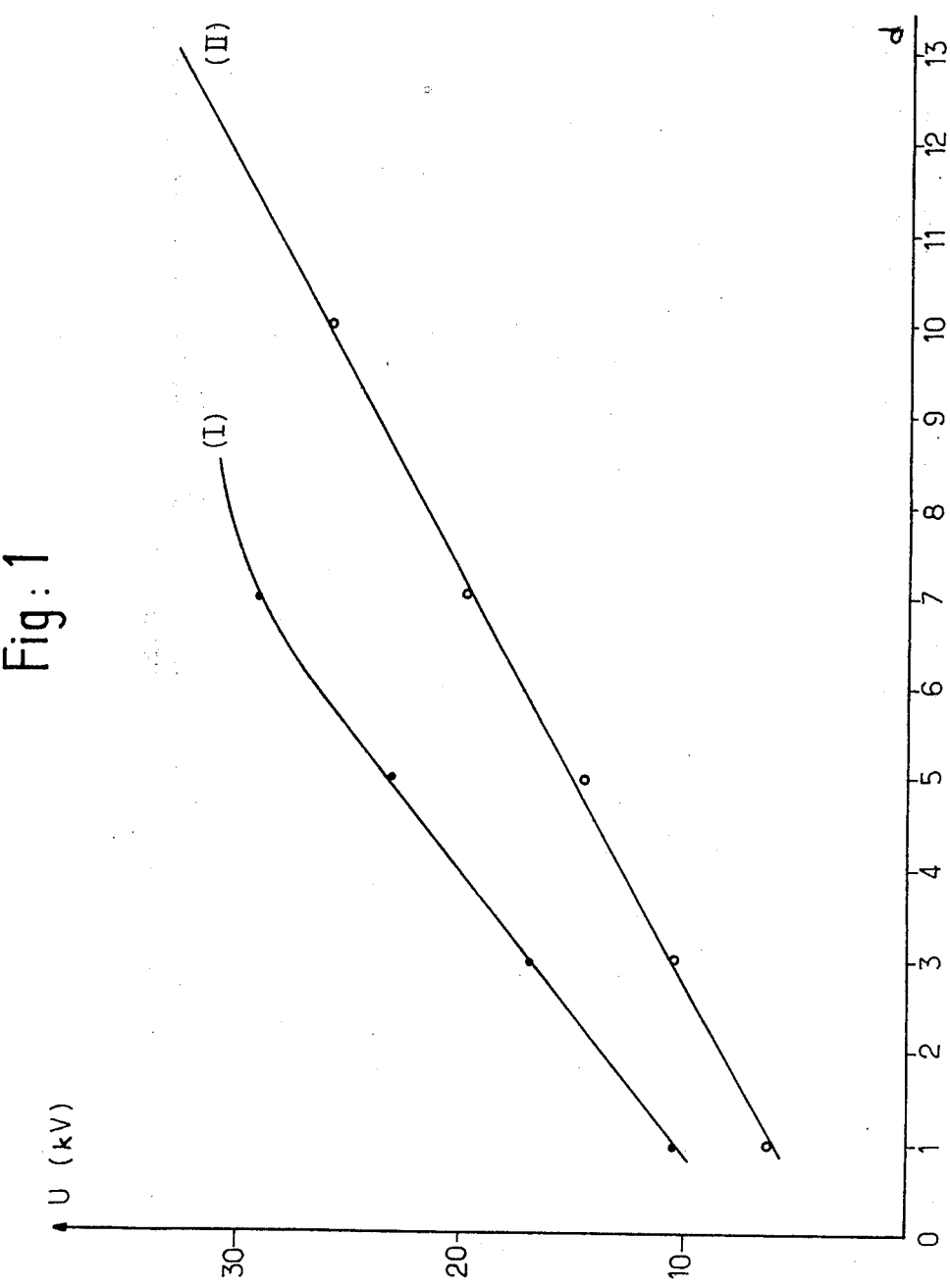
Fig: 1

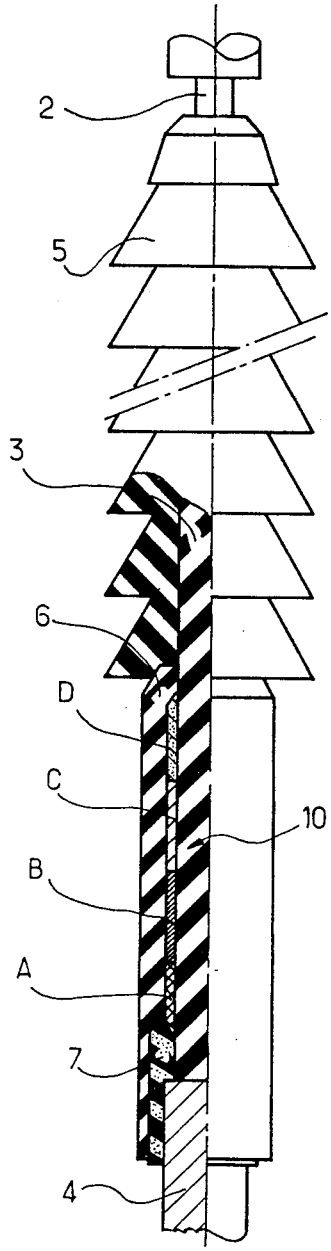
Fig: 2
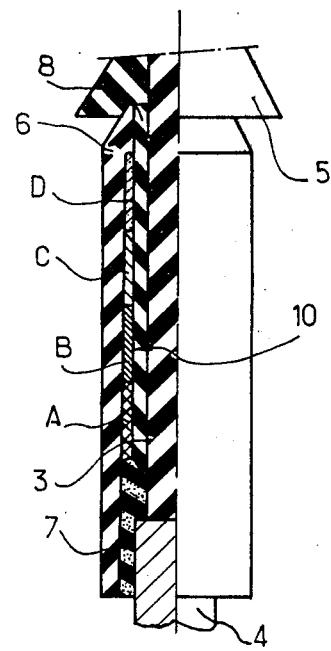
Fig: 3
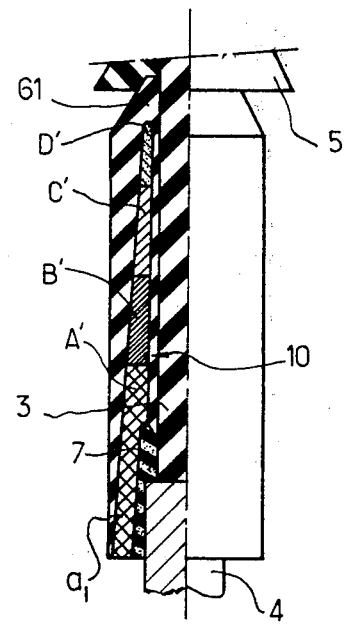
Fig: 6

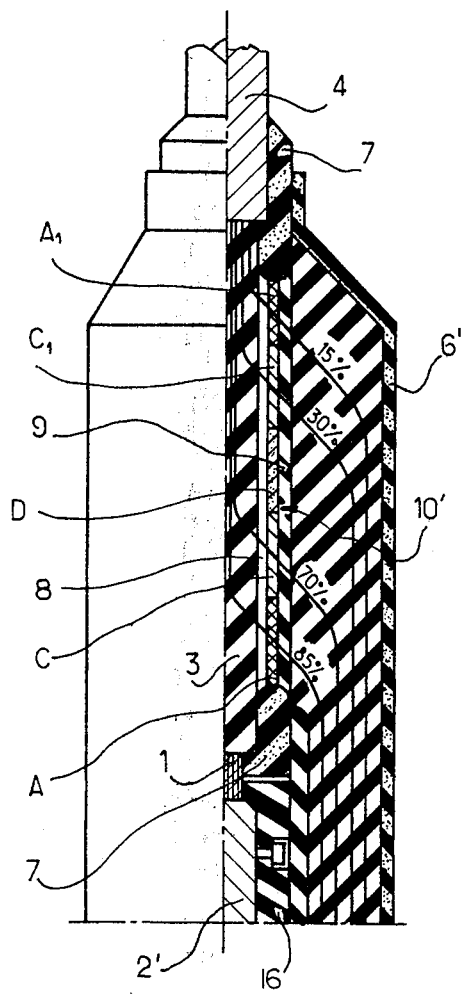
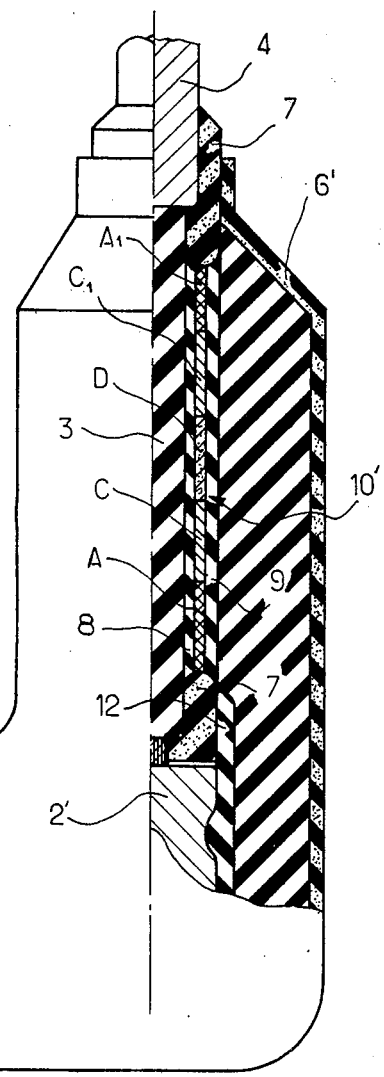
Fig: 10
Fig: 12

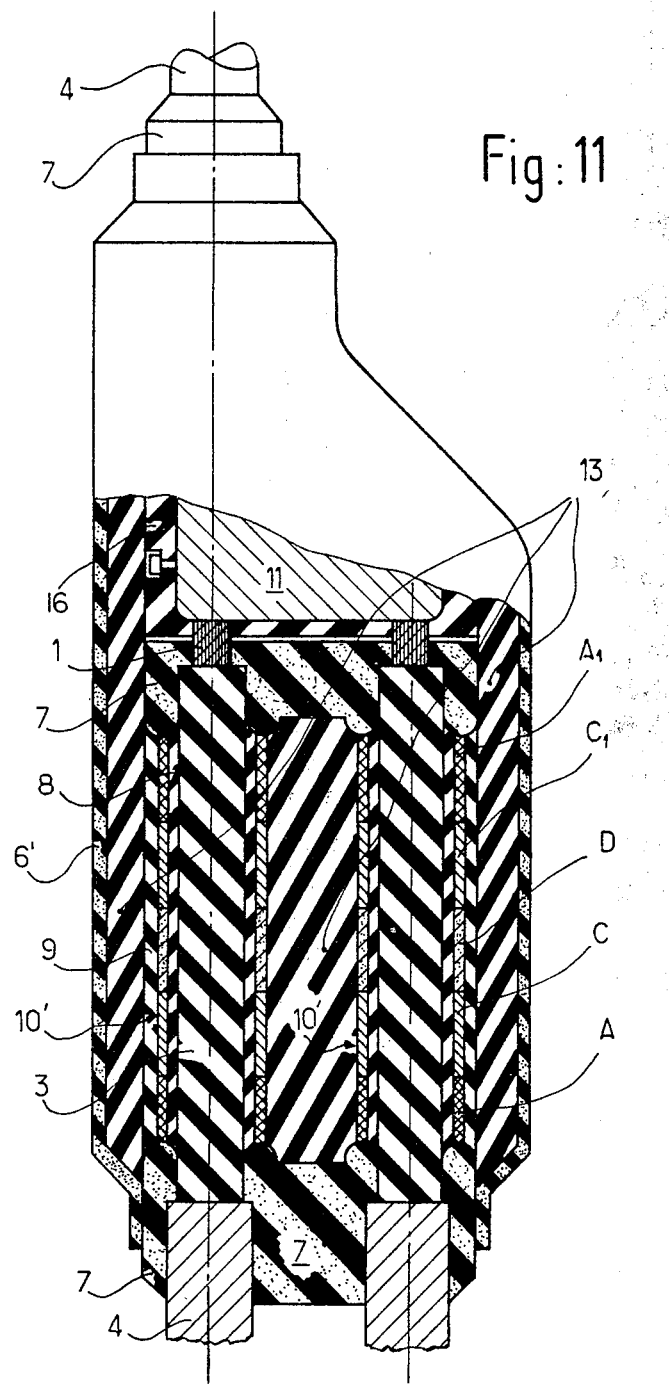
Fig: 11

ELECTRICAL STRESS CONTROL ELECTRODE IN COMBINATION WITH A JUNCTION END OF A SHIELDED INSULATED ELECTRICAL CONDUCTOR

TECHNICAL FIELD OF THE INVENTION

The invention relates to connection equipment for electrical power transmitting circuits or networks and more particularly to electrical stress reduction or control electrodes for termination zones exhibiting discontinuities of the constituting elements, more particularly for high voltage cables.

BACKGROUND ARTS

It is well known that in electrical power transport equipment, such as high voltage or extra high voltage cables, there exists, at the level of the cable connection zones, such as in cable joints, cable branching or connection to cells or transformers, a discontinuity of the electrical field adjacent the end of the cable shielding. When the electrical discontinuity or potential gradient exceeds a predetermined value along the surface of the unshielded electrical conductor insulator surrounded by a gas, such as the air, gas discharges may occur which generate ozone and other gases which can affect greatly the electrical insulating equipment. To prevent such drawbacks, use in generally made at the level of the cable shielding interruption of cone-shaped termination equipment or deflective cones including or not condensers, which generally show outer dimensions far greater than the proper cable terminator, more particularly on extra high voltages. Said deflective cones have to be arranged within procelain insulators filled with an insulating material, thereby leading to problems in handling and connecting said integers in situ.

It is also known to make use for low voltage cables of materials exhibiting non-linear resistance characteristics, high permittivity materials and carbon black-based materials having a calibrated resistance. French application No. 2,423,036 to the assignee discloses a self-blending mastic compound containing silicon carbide particles of a calibrated constant granulation or grain-size disposed at the level of the shielding end so as to extend onto the outer surface of the unshielded conductor insulator along a required distance to prevent electric discharges and to obtain the desired electrical characteristics at the termination end. Said different products show, however, limited performances as a result of heating in over-voltage conditions, and there are no hints to utilize same for manufacturing efficient electrical stress reduction or control electrodes on high voltages, nor particularly on extra high voltages.

On the other hand, in manufacturing cable terminators, it has been proposed to substitute pre-manufactured junction equipment assemblies of synthetic rubbers for the insulators of glass, porcelain or epoxy resins, thereby facilitating handling and mounting in situ. However, said junction equipment assemblies show limited electric performances, as also the junctions and the branching equipment where moulded cast iron boxes have been replaced by ribboned or cold-casted resin assemblies.

SUMMARY OF THE INVENTION

It is an object of the invention to provide an electrical stress reduction or control electrode exhibiting improved electrical properties on high and extra high voltages and which allows realization of improved ready-to-use prefabricated equipment.

Another object of the invention is to provide such an electrode which may achieve a linear repartition of electrical voltages along the outer visible or unshielded portions of the insulator of an electrical conductor.

According to the invention, there is provided an electrical stress reduction or control electrode to be arranged at the level of a shielding end of an electrical conductor around the periphery of the visible or unshielded portion of the conductor insulator, which comprises at least a sheathing member including at least two adjacent successive zones in the axial direction of the conductor, each zone exhibiting a controlled non-linear electrical resistance different from the electrical resistance of the adjacent zone.

According to a feature of the invention, the sheathing member is made of a support compound (i.e., binder) of plastic material including particles exhibiting non-linear resistance characteritics, two adjacent zones of the sheathing member each having a different density of particles in the plastic material.

According to an embodiment of the invention, the successive zones incorporate particles of different grain sizes. In an alternative embodiment, the different zones incorporate different concentrations of particles having substantially the same grain size.

These and further objects of the invention will be apparent from the following specification, taken in conjunction with appended drawings forming a part thereof.

BRIEF DESCRIPTION OF THE DRAWINGS

FIG. 1 is a comparative diagram illustrating the performances of an electrical stress reduction or control electrode incorporating uniformly distributed particles exhibiting non-linear electrical resistance characteristics of same grain size and a stress control electrode according to the invention;

FIG. 2 is a longitudinal view, partially in cross section, of a prefabricated cable terminator including a stress control electrode according to the invention;

FIGS. 3 to 7 illustrate, partially in longitudinal cross section, different alternative embodiments of the stress control electrode of the invention;

FIG. 10 illustrates, partially in longitudinal cross section, an alternative embodiment of the junction with additionally the plotted voltage curves as obtained with a stress control electrode of the invention;

FIG. 11 illustrates, partially in longitudinal cross section, a branching including a stress control electrode according to the invention;

FIG. 12 is a view, partially in longitudinal cross section, of an integral plug-in terminator with an adaptator including a stress control electrode of the invention.

DETAILED DESCRIPTION OF THE BEST MODE OF THE INVENTION

Figure 4:
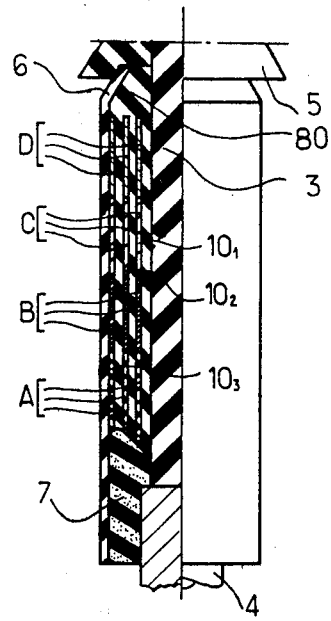

In the following specification, analogue or identical integers of the terminators or junctions are identified by the same reference numerals, eventually with an indicia.

The invention will be first disclosed more particularly with respect to a prefabricated termination assembly for a high voltage insulated cable (such as a 63 kV cable) illustrated in FIG. 2. As seen in FIG. 2, the end of the conducting core of the cable is electrically connected to a cable lug 2 for connection to a high potential. Said conducting core extends within a surrounding insulating sheath 3 which is in turn normally surrounded, all over the length of the cable, by a conducting shield 4. The above-mentioned problems of potential gradients occur at the level of the end of said shield 4 along the visible surface of the insulator 3 of the conducting core. The prefabricated cable ending comprises typically a series of insulating conical skirts 5, for instance of moulded cross-linked EPDM, which are slipped over the insulator 3 above an outer insulating sleeve 6 advantageously made of cross-linked EPDM. The insulating sleeve 6 extends over the end of the shield 4 while being axially closed there by an adaptor 7 of an electrically conducting elastomer compound insuring electrical contact with the conducting shield 4 of the cable.

According to the invention, the stress control or reduction electrode, generally designated by reference numeral 10, is arranged between the outer sleeve 6 and the cable insulator 3 and comprises a sheathing member having four successively axially joined zones A,B,C,D applied onto the cable insulator 3, the successive zones A to D being adjacent one to each other in the axial direction of the electrode 10. The end electrode zone A is in bounded contact with the adaptor 7. The different zones A to D each exhibit, for a determined voltage, a non-linear electrical resistance different from the resistances of the adjacent zones so as, from A to D, the electrical resistance progressively increases toward the high potential end of the terminator. Typically, the stress control electrode 10 is obtained by embedding within an insulating support compound or binder of plastic material finely divided particles of a material exhibiting an electrical resistance which is non-linear and varies with the applied voltage V. Assuming that I is the current intensity through a control electrode zone, there is the following relation: $I = kV^Y$, k and Y being constants and Y being greater than 1.

According to a feature of the invention, the resistance variation of the different zones of the electrode 10 is achieved by progressively diminishing the density of the particles embedded within the insulating plastic material of the electrode toward the portion thereof remote from the conducting members, whereby said variation in the density of the particles in the successive zones confers to the electrode a non-linear electrical resistance decreasing toward the parts to be protected, i.e. a resistance which increases toward the parts at a high potential. The variation in density may be obtained by progressively setting the concentration of particles having a substantially constant grain size of the active material exhibiting a non-linear variable resistance or, alternatively, by determining, for the different zones of the electrode, a constant concentration of the particles, said latter having, however, different grain-sizes from one zone to another, by taking into account the fact that the effect conferred by the particles of active material is the more important as the grains are greater for a same overall volume of the finished product. In the present specification, there are disclosed stress control electrodes which comprise a series of end-to-end successive individual elements or zones, but it should be understood that the resistance variations may be obtained by varying continuously in the axial direction the concentration of particles of a substantially constant grain size in a common sleeve-shaped element formed of a support compound or binder of plastic material, said concentration of particles in the plastic support compound or binder varying for instance from 30 to 70%.

In the embodiment illustrated in FIG. 2, the binder or support compound constitutive of the different elements or zones of the stress control electrodes may be a plastic material chosen from the group comprising polyethylene, PVC, thermoplastic or cross-linkable elastomers such as a PDM, EPR, polyurethane, polyester, elastomers including cold-or-hot castable or hardenable components chosen from the group comprising silicones, polyurethane, polybutadiene, the resins including cold-or-hot hardenable components such as polyester, polyurethane, epoxy resins or phenolic resins. Use can also advantageously be made of the elastomer and liquid-containing mastic compound disclosed in the above-mentioned French application No. 2,423,036, the content of which is incorporated herein by reference, of insulating liquids such as naphtenic, aromatic or paraffinic oils, silicone oils, as also of ceramics, porcelain, refractory earth, enamel, glass, concrete or plaster, or heat-shrinkable plastics which are put in place by means of a portable heat generating means.

The support compounds constitutive of the electrode are determined for allowing a controlled incorporation therein of particular active material exhibiting variable electric resistance properties, chosen from the group consisting silicon carbide, metallic oxides such as natural or precipitated silica, titanium oxide, zinc oxide, magnesium oxide, alumina or asbestos. Typically, the part members or zones of the stress control electrode are manufactured by incorporating within a support compound from about 30 to 85% of a mixture of said particular active products. In a generic way, the active product is chosen for each zone of the electrode with respect to the position of said zone in the electrode and depending upon the mesh dimensions of the sieve or the screen defining an average grain size for the particles. Use can be made of particles from a screen of 8 wires corresponding to an average grain size of $2380\mu$ up to a screen of 1200 wires corresponding to an average grain size of $3\mu$. In the embodiments wherein the progressive electric resistances of the different zones of the electrode are achieved by modulating the grain size of the active product particles, typically silicon carbide or zinc oxide particles, the dimension of the particles will be diminished from zone A to zone D so as to distribute in a linear fashion the equipotential lines (see FIG. 10), the determination of the grain size of the particles in starting end zone A being determined with respect to the serviceable voltage of the cable.

As an illustrative mode for manufacturing the electrode of FIG. 2, the cable terminator 3 being made of a 20 kV, $1 \times 150$ mm$^2$ polyethylene, zone A is made of the above-mentioned mastic compound including 70% by weight of silicon carbide particles screen 90, zone B of such a mastic including 70% of silicon carbide particles screen 180, zone C of the same mastic compound including 70% of silicon carbide particles screen 280, and zone D of the same mastic compound including 70% of silicon carbide particles screen 500. It is to be understood that the determination of the grain sizes in the different zones is not limited to the above example. The dimensions (length in the axial direction, thickness in the radial direction) of the active zones of the electrodes are not critical but depend closely on the available space around the cable insulator in the terminator or junction. As a rule, the thickness of the electrode increases with the serviceable voltage and is chosen greater than 5/10 mm for a voltage of 20 kV and greater than ⅜ mm for a voltage of 200 kV. Yet improved electrical characteristics are obtained by continuously varying the grain size of the particles from the coarser screen towards the thinner screen along the axial length of the continuous sleeve-shaped element of the electrode. In another embodiment, for a similar cable terminator, the variation of resistance is obtained by modifying from a zone to another zone the concentration of particles having an average grain size. Zones A to D are thus obtained by dispersing in the mastic compound 70%, 60%, 50% and 40% respectively of silicon carbide particles having a substantially constant average grain size of 37μ. In said particular embodiment, each zone A to D has an axial length of 7 cm and a thickness of 3 mm, thereby resulting in a stress control electrode having a length of 28 cm for an overall length of the cable terminator of 45 cm. The following results have been determined:

partial discharge at the nominal voltage <1 pico coulomb,
1/50 shock wave: 250 kV flash-over,
dielectric strength: 1 hour at 125 kV,
flash-over voltage: 10 mn at 135 kV, i.e. characteristics which are 65% better than the characteristics of the prior-art techniques.

There are plotted in FIG. 1 curves showing the good linearity of the distribution of the equipotential lines achieved with a stress control electrode according to the invention (curve II) as compared with a stress control electrode the support compound of which homogeneously includes particles of constant grain size (curve I). The voltage measures along the stress control electrodes are in ordinates when the axial distance from the shield end 4 are in abscissae.

The cable terminator illustrated in FIG. 2, including a stress control electrode 10 in tightly contacting relationship with the cable insulator 3, is more particularly convenient for insulated cables on a serviceable voltage not higher than 63 kV, thereby leading to a maximum potential gradient $G_{max} < 4000$ V/mm at the electrode/insulator interface.

There is illustrated in FIG. 3 another embodiment corresponding to a terminator for an insulating cable on a nominal voltage of 90 kV and including, between the stress control electrode 10 and the cable insulator 3, an intermediate underlying insulating layer 8 having a thickness close to that of the electrode and a relative permittively $\epsilon$ not lower than the permittivity of the cable insulator 3. For higher voltages, several underlying layers 8 may be provided, the permittivity $\epsilon_i$ of each of which is determined so as to increase progressively up to the value $\epsilon_1$ corresponding to the more conducting zone (A) of the stress control electrode 10. Said underlying layers 8 radially separate the stress control electrode from the conducting core of the cable, so as to maintain, in combination with a deflecting cone at the level of the electrode 10, a maximum potential gradient which is always lower than 4000 V/mm, as above mentioned. The different zones A–D of the stress control electrode 10 in the embodiment of FIG. 3 are obtained by dispersing in EPDM silicon carbide particles having the following dimensions: from A to D, 60% of particles screen 90, 60% of particles screen 180, 60% of particles screen 280, and 60% of particles screen 500, respectively. The measured performances are as follow:
partial discharge <1 pico coulomb at 80 kV,
1/50 shock wave: 525 kV flashover,
dielectric strength: 1 hour at 200 kV.

Substantially homothetical dimensions may be adopted for stress control electrodes for cable terminators on voltages of 110 kV, 150 kV, 225 kV and beyond. The intermediate underlying insulating layer 8 may be made of any convenient dielectric material such as a solid dielectric material, a gas under pressure (for instance nitrogen), sulphur hexafluoride, or confined insulating oil or grease.

There is illustrated in FIG. 4 an embodiment of a similar cable terminator comprising three identical radially spaced concentric stress control electrodes $10_1$, $10_2$ and $10_3$ each comprising four successive zones A to D. The different electrodes are separated from each other and from the cable insulator 3 by insulating underlying layers 80 each having a relative permittivity $\epsilon$ greater than that of the cable insulator 3.

Figure 5:
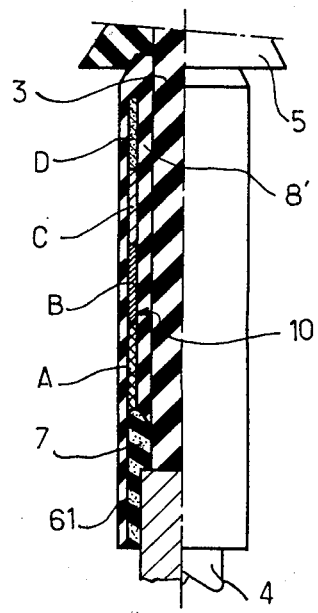

In the embodiment illustrated in FIG. 5, the electrode 10 is received or embedded within a sleeve member 61 which comprises, in addition to its usual outer peripheral portion, an inner axially extending tubular protrusion 8' which acts as the above-mentioned underlying layer and has a relative permittivity $\epsilon$ greater than that of the cable insulator 3. In the embodiment of FIG. 6, which is similar to that of FIG. 5, the zones A' and D' of the control stress electrode 10 have a thickness in the radial direction which decreases from the end of the cable shield 4, the adjacent tapered thicker end zone A' further comprising an outwardly axially extending skirt portion $a_1$ which completely surrounds the conducting adaptor 7.

Figure 7:
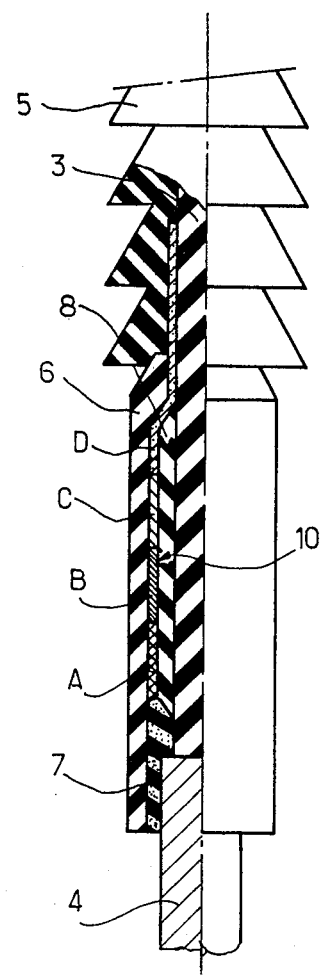

In the embodiment of FIG. 7, similar in some points to that of FIG. 3, the distal end zone D of the electrode 10 is prolongated axially outwardly beyond the underlying layer 8 to be pressed directly onto the cable insulator 3, thereby separating the distal end of the outer insulating sleeve 6 from said cable insulator. The dimensions and number of the zones of the electrode 10 may vary depending upon the number of the insulating skirts 5 of the prefabricated cable terminator.

Figure 9:
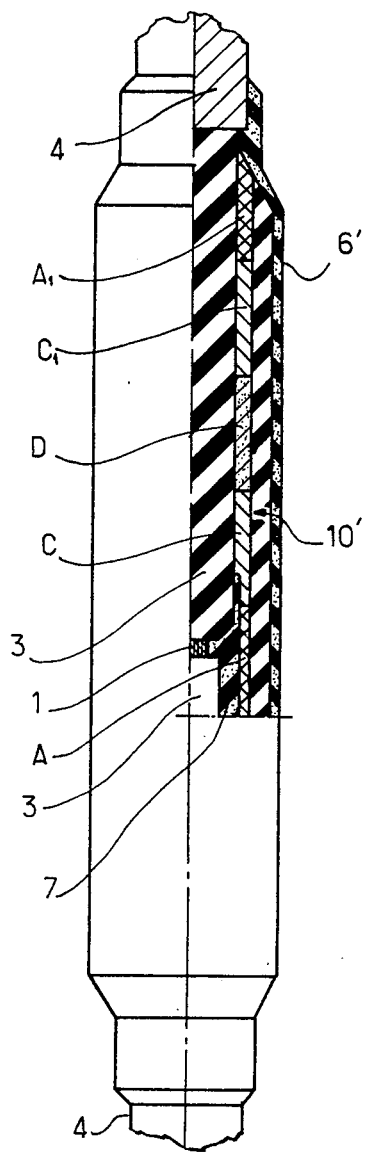
FIGS. 8 and 9 illustrate, partially in longitudinal cross section, cable junctions including stress control electrodes according to the invention.
Figure 8:
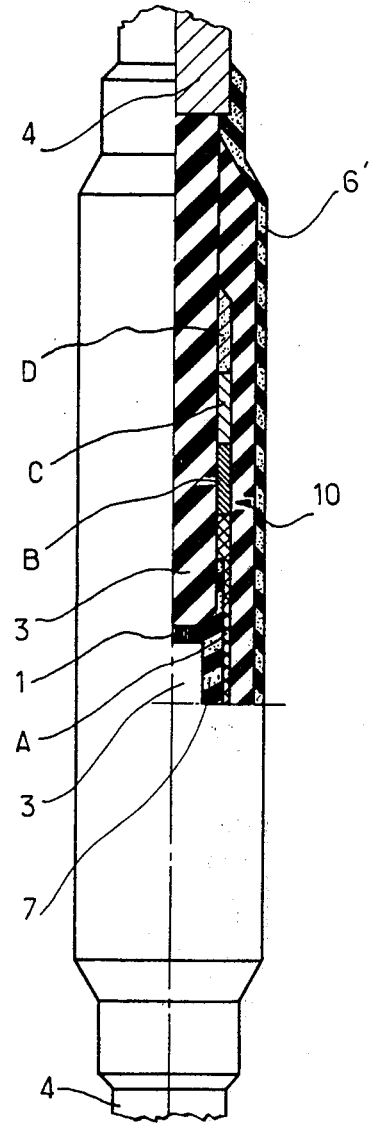

There are illustrated in FIGS. 8 and 9 two embodiments of a prefabricated integral cable junction utilizing another stress control electrode according to the invention. In said figures, the outer sleeve 6' is here prolongated axially so as to have its opposite end brought into tight bearing contact with the end portions of the shields 4 of the ends of the joining cables, said outer sleeve 6' being also made of a conducting plastic material. The zones A to D of the electrode 10 are here serially arranged or distributed with respect to the junction zone between the cable ends where the stripped conducting cores 1 of the cables are visible. The distal end zone D is, however, not prolongated up to the end of the adjacent shield 4 of the corresponding cable end, the end portion of the outer sleeve 6' being interposed therebetween. As in the preceding embodiments, the less resistive electrode zone A, which is here a middle zone of the electrode, is in bounded contact with the adaptor 7 made of a conductive compound which surrounds the joined conducting cores 1 of the cables. The electrode 10' is prolongated symmetrically (not shown) toward the other end of the shield 4 of the other cable end. FIG. 9 illustrates such a prefabricated integral cable junction but including a stress control electrode 10' having zones in opposed activity relationship. In said embodiment of FIG. 9, the less resistive middle zone A of the electrode still contacts the adaptor 7, but the previous zone B is omitted so as the electrode 10' presents, toward each cable shield 4, a first series of zones C,D and then, a second series of zones $C_1$ (identical to zone C and in symmetrical relationship thereto with respect to zone D) and $A_1$, analogue and symmetric to zone A but in contact with the end of sleeve 6'.

There is illustrated in FIG. 10 a prefabricated integral cable junction for adapting different cable diameters, which comprises, as in the embodiment of FIG. 9, a stress control electrode 10' the active zones of which are arranged in opposed relationship. In said embodiment, there is provided between the electrode 10' and the cable insulator 3 an underlying layer 8 of the above-described character, the electrode 10' being in turn surrounded by an insulating sleeve 9 the permittivity of which is also greater than that of the cable insulator 3. As in FIG. 9, the electrode 10' is symmetrical with respect to its middle zone D having a low density of silicon carbide particles. Each end zone A and $A_1$ is in contact with an adaptor 7 arranged at the levels of the end of the shield 4 and of the conducting core 1 of the cable, respectively, said core being electrically connected to a conducting member 2' held within an insulating housing 16. The equipotential lines plotted in FIG. 10 illustrate the efficiency of the stress control electrode according to the invention.

There is illustrated in FIG. 11 a prefabricated integral branching wherein the conducting core of a first cable having a peripheral conducting shield 4 (top of the figure) is electrically connected to a connecting block 11 arranged within an insulating housing 12 and from which extend a main line and a derivation line, respectively (bottom of the figure), each having a conducting core 1 connected to said connecting block 11. Each of said last-mentioned output lines is equipped with a stress control electrode 10' the active zones of which are in a symmetrical or opposed relationship as disclosed in relation with the embodiment of FIG. 10. It should be noted that, in said branching, the adaptors 7 are common to both output lines and that, in addition to the intermediate surrounding insulating sleeves 9 around each electrode 10', an insulating material 13 completely fills the housing 6' of the branching.

There is illustrated in FIG. 12 a plug-in cable end which comprises a bent connection portion 15 and an adapting portion including a stress control electrode 10' having its active zones in an opposed relationship as in the embodiments of FIGS. 10 and 11.

Figure 13:
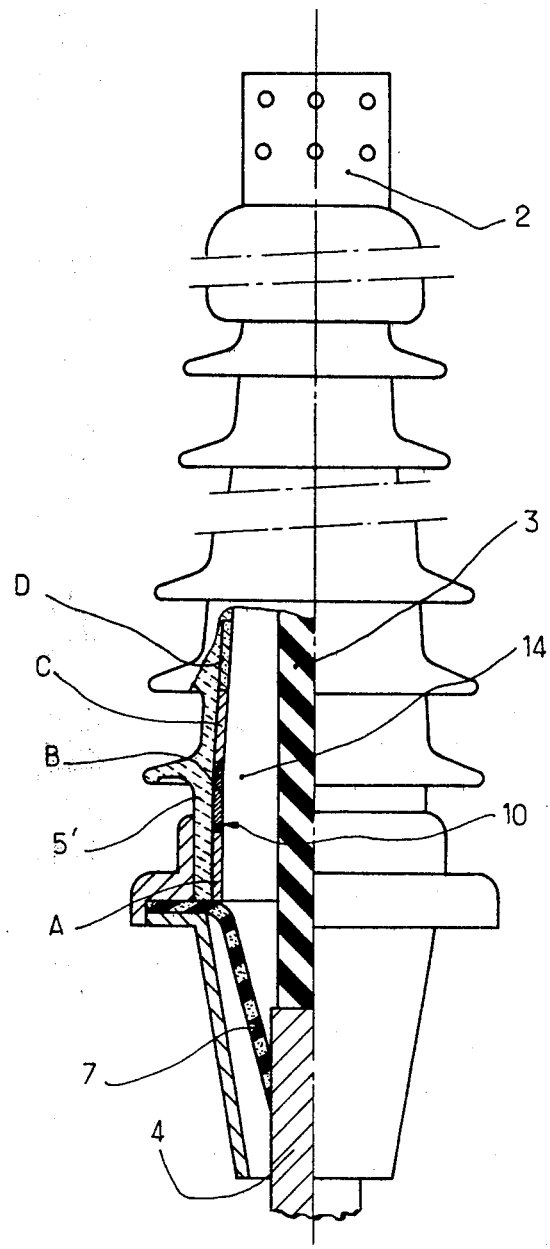
FIG. 13 illustrates, partially in longitudinal cross section, a porcelain terminator equipped with a stress control electrode of the invention.

Although the electrode of the invention is more particularly convenient for a compact prefabricated electrical equipment utilizing elastomeric materials, it can also be for use in improving the performances of usual porcelain insulators. There is illustrated in FIG. 13 a cable terminator analogue to that of FIG. 3 but including here a hollow block of porcelain skirts 5'. The stress control electrode 10, similar to that of the embodiments of FIGS. 2 to 6, is applied onto the inner wall of the block 5' at a radial distance from the conductor insulator 3. The inner space between the cable insulator 3 and the block 5' is axially closed adjacent the cable shield end 4 by a frusto-conical adaptor 7 and filled with an insulating fluid 14 such as a gas under pressure, for instance air or nitrogen, an insulating grease or an insulating oil.

Although the present specification relates to preferred embodiments, it should be understood that the invention is not limited to said embodiments and includes all modifications and developments within the scope of the appended claims.

What I claim is:

1. An electrical stress control electrode in combination with a junction end of an elongated shielded and insulated electrical conductor, said electrical stress control electrode being arranged around the periphery of the conductor insulator at the level of the end of the shield of the conductor and comprising:
    at least two sheathing members radially separated from each other and each including a plurality of successive adjacent zones in the axial direction;
    each zone comprising particles of at least an active material exhibiting variable non-linear electrical resistance properties dispersed in an insulating binder;
    said particles being so distributed and size-selected as to progressively increase the electrical resistance of said successive adjacent zones towards one end;
    an internal tubular layer of insulating material interposed between the radially innermost sheathing member and said conductor insulator, said layer having a relative permittivity greater than that of said conductor insulator; and
    an insulating medium so designed as to separate said sheathing members from each other in a direction perpendicular to said axial direction.

* * * * *